Figure 1:
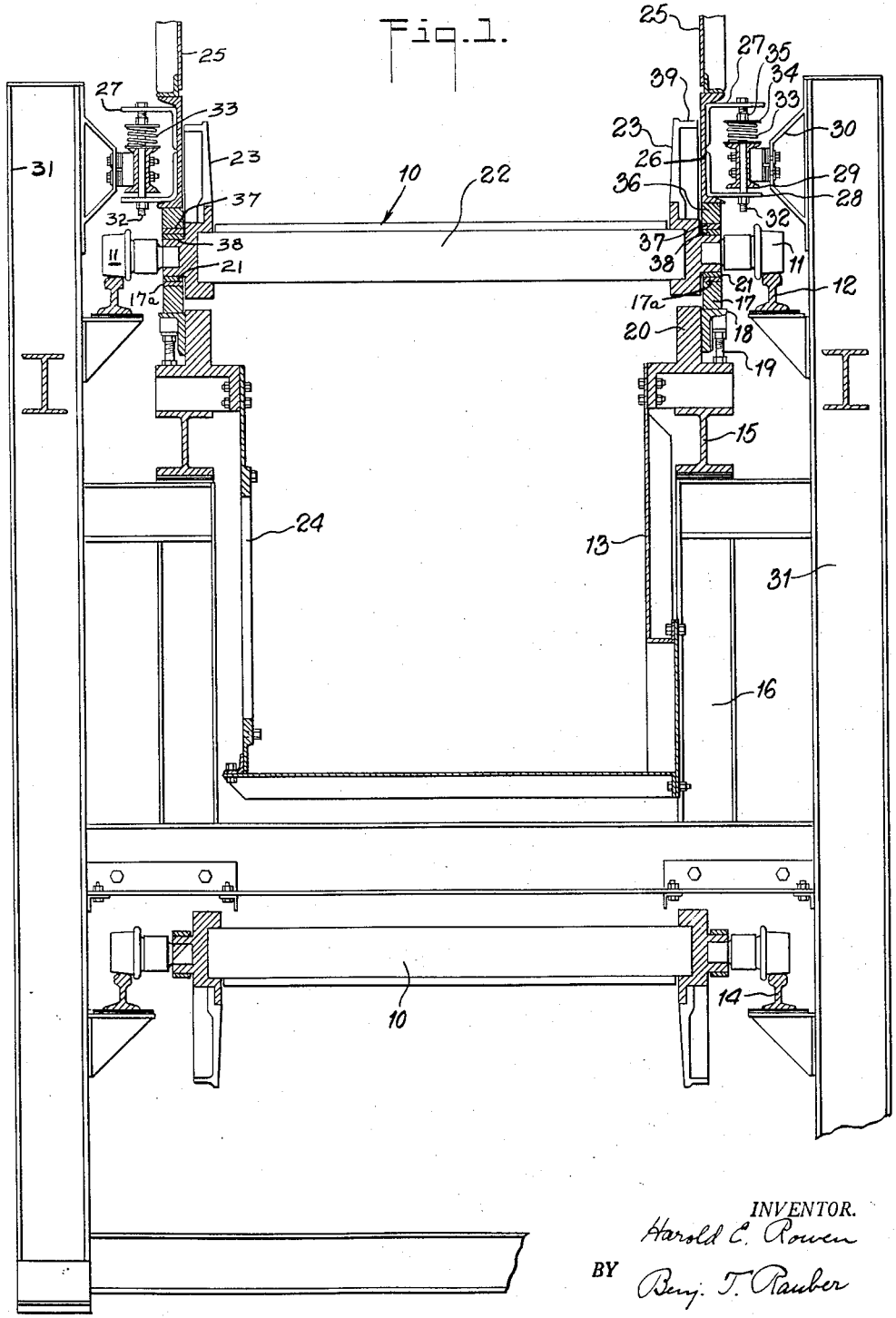

Sept. 16, 1958      H. E. ROWEN      2,852,244
WIND BOX SEAL FOR SINTERING MACHINES Filed Jan. 26, 1955      3 Sheets-Sheet 1

INVENTOR.
Harold E. Rowen
BY Benj. T. Rauber
his ATTORNEY

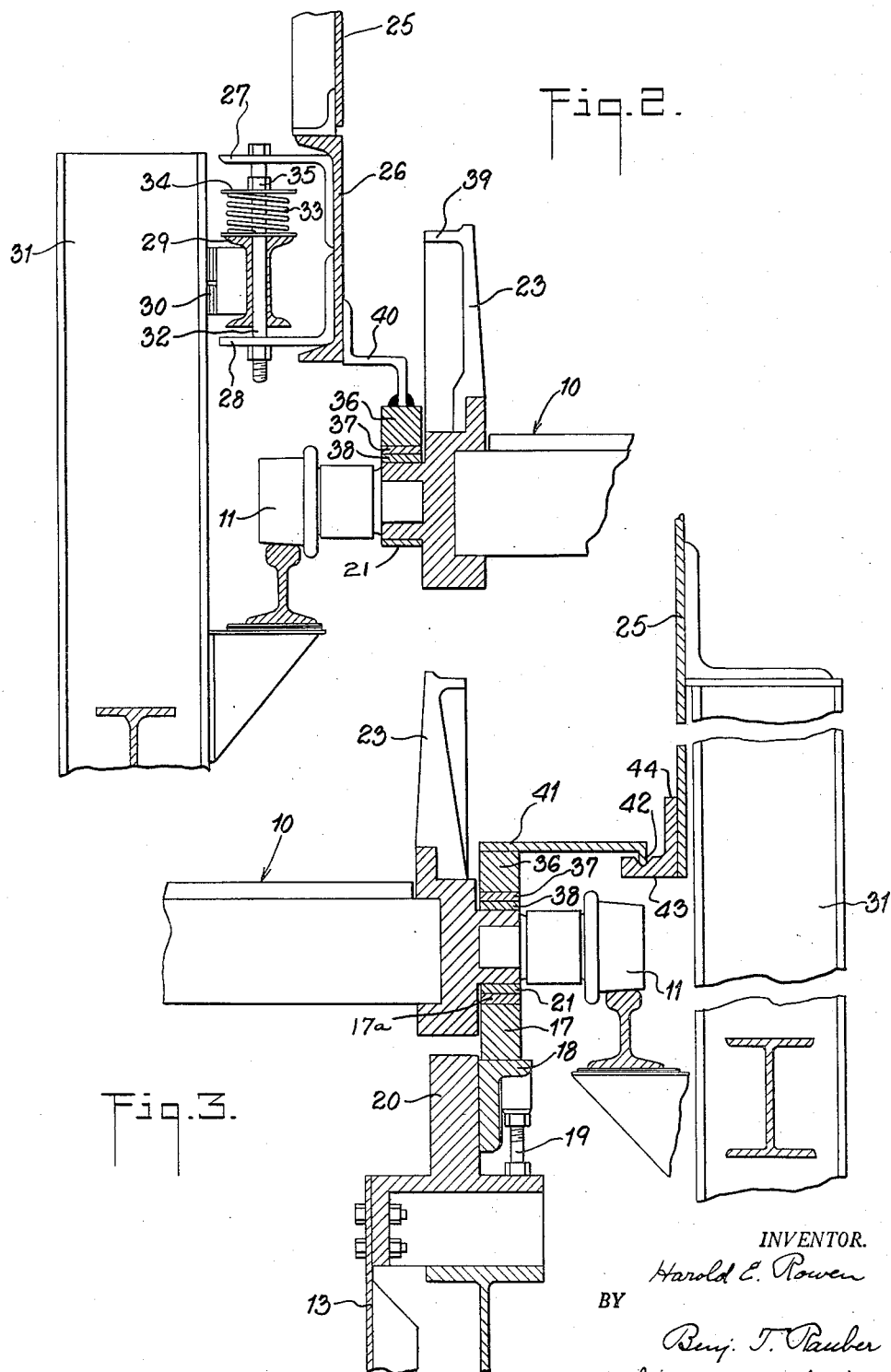

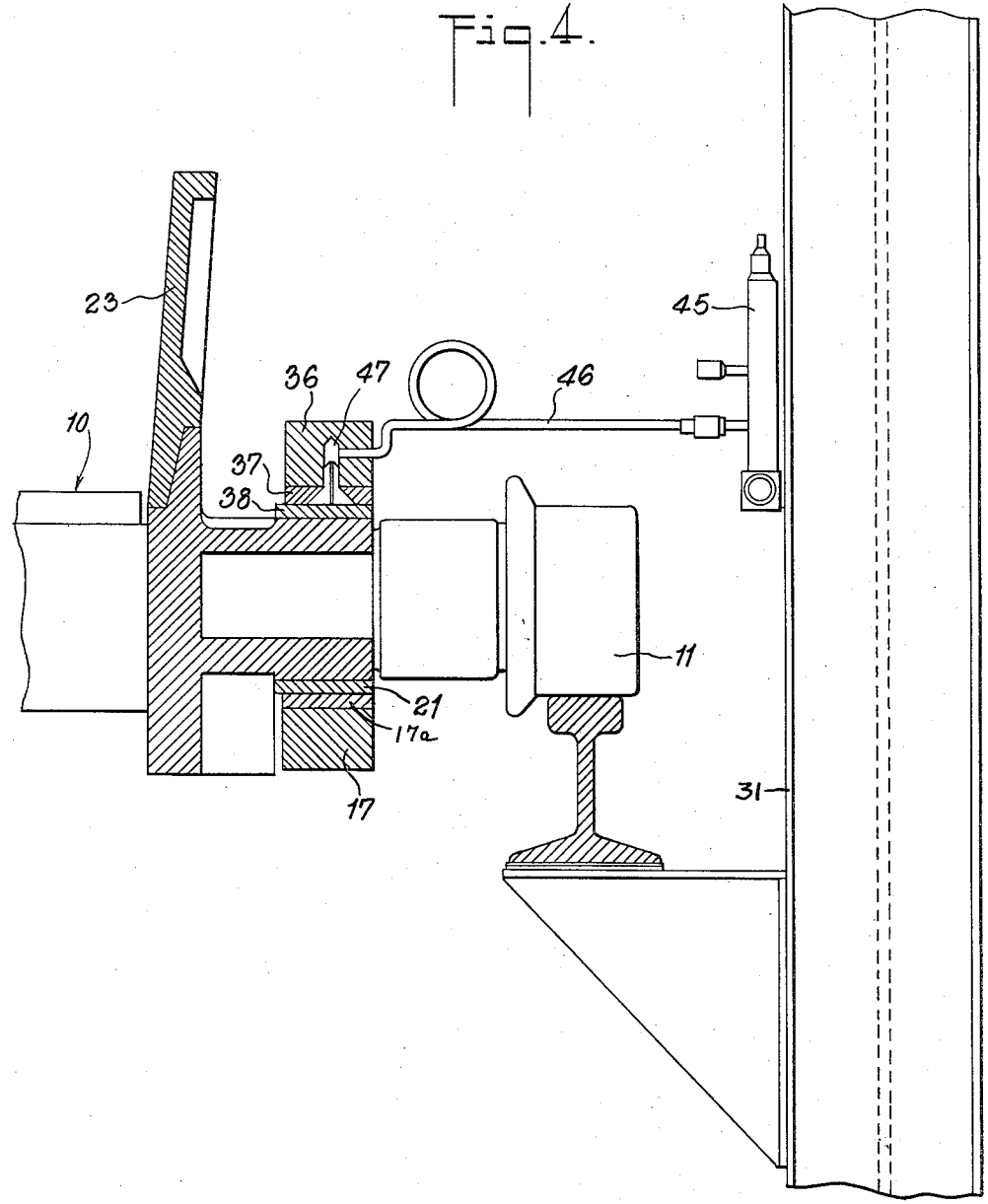

United States Patent Office 2,852,244
Patented Sept. 16, 1958

2,852,244

WIND BOX SEAL FOR SINTERING MACHINES

Harold E. Rowen, Stanhope, N. J., assignor, by mesne assignments, to McDowell Company, Inc., Cleveland, Ohio, a corporation of Ohio Application January 26, 1955, Serial No. 484,095

6 Claims. (Cl. 266—21)

My invention relates to continuous, or traveling grate, sintering machines used for sintering, calcining, roasting, drying or baking of metallurgical or industrial products and, more particularly to an improved sealing means between the moving pallets of the grate and an upper hood or inverted wind box above the pallets.

Sintering machines of the above type are used in a wide variety of processes in which the material to be treated is placed on pallets moving in contact with each other in succession over a wind box having an open upper end. The space above the succession of pallets is enclosed by a hood or inverted wind box and air for combustion or gases for treating the material may be passed upwardly from the lower wind box through the material on the pallets to the hood or upper wind box or reversely downwardly from the upper, inverted, wind box into the lower wind box as conditions for processing may require. The machines may operate under suction or partial vacuum or under super atmospheric pressure in either the lower or upper wind box. In some cases a suction or partial vacuum may be used to draw off noxious gases produced in the processing of the material on the pallets. For the proper and efficient operation of the apparatus it is necessary to provide a seal between the hood and the traveling pallets which effectively prevents leakage of gases between the inverted wind box or hood and the traveling pallets.

The pallets are formed with horizontal grate surfaces and upwardly rising sides to retain the material on the grates. The sides of the pallets are subject to great variations of temperature from direct heat from ignition burners, from the material being processed and from other sources and are accordingly subject to uneven warping, grain growth and shrinkages which prevent effective sealing with the walls of the upper windbox or hood.

In my invention I provide an effective seal between the pallets and the edge of the windbox which is not exposed to heat within the windbox and pallets and is not subject to variations in shape caused by temperature variations.

My invention provides each pallet with a pair of pallet seal bars, one spaced outwardly from each side wall of the pallet and joined airtight thereto on which rests with a sliding contact a hood seal bar at the lower edge of the corresponding side of the hood or upper windbox. Suitable lubrication may be supplied between the opposed faces of the pallet seal bar and the hood seal bar. The hood or upper windbox rests on the pallet seal bars with a controlled pressure. For this purpose it may be supported in part by springs, by hydraulic balancing, by counterweights or equivalent means which carry an adjustable part of the weight of the hood, the balance being supported by the pallet seal bars. Or the hood seal bar may be flexibly and airtightly secured to an independently mounted hood and rest on the pallet seal bars with its own weight or with additional weighting or spring means.

As the pallet seal bars are spaced from the pallet side walls and from the space within the hood or upper wind box and are in heat exchanging contact with the atmosphere, they remain relatively cool and undistorted and provide an effective, uniformly tight, seal with the hood seal bars. The contact surfaces of the pallet seal bars and hood seal bars may be horizontal, or inclined or of angle or other shape in transverse section. There is thus provided a uniform sealing pressure between the undistorted succession of moving pallet seal bars and the hood seal bars.

The various features of my invention are illustrated by way of example in the accompanying drawings in which, Fig. 1 is a vertical section, transverse to the path of the pallets, of the lower part of a hood or upper wind box, the pallets and the lower wind box of a sintering machine embodying my invention, Fig. 2 is a vertical transverse section of a lower edge of the hood or upper wind box and a pallet illustrating another embodiment of the invention, Fig. 3 is a vertical transverse section of a lower edge of a hood or inverted wind box and a pallet illustrating another embodiment of the invention, and Fig. 4 is a detail of a lubricating system applicable to the above modifications.

In the embodiment shown in Fig. 1, the invention is illustrated as applied to a sintering machine having a succession of traveling pallets 10 supported by wheels 11 at each side in an upper path of travel on horizontal rails 12 above a lower windbox 13 or by other supporting means. The pallets are supported in a return path in inverted position on a pair of rails 14 or other means beneath the windbox. The windbox is supported at each side by I-beams 15 mounted on a supporting structure 16. The windbox is open at its upper end and is sealed to the succession of pallets traveling on the upper rails 12 by a seal bar 17 mounted on an angle iron 18 adjustably mounted on the I-beam 15 by means of adjusting screws 19 and fitting airtightly against an upwardly extending rib 20 of the I-beam 15. The angle iron 18 is adjusted upwardly until the wear strip 17a on the seal bar 17 fits airtightly against the lower surface of a pallet seal bar 21 carried by the pallet.

Each pallet comprises a horizontal grate 22 and has at each side of the grate an upwardly extending side wall 23 to confine the material on the grate. The pallets move over the lower windbox 13 in endwise contact to enclose the upper end of the windbox. Air or gas supplied to or exhausted from the windbox 13 through an opening 24 passes upwardly or downwardly, respectively, through the material on the pallets.

The side walls 25 of a hood or inverted windbox are supported above the pallets on horizontal side beams 26 which are, in turn, supported primarily by the supporting structure 16. For this purpose the beam 26 at each side of the hood is provided with an upper bracket 27 and a lower bracket 28 between which extends a supporting rail 29 bolted to a side extension 30 of a pillar 31 which also carries the structure 16. A guiding and supporting bolt 32 extends from the upper bracket 27 slidably through the rail 29 and is secured in fixed position to the upper and lower brackets. A coiled spring 33 is mounted on the upper surface of the rail 29 about the bolt 32 and bears against a plate 34 at its upper end which is, in turn, secured at an adjustable height on the bolt 32 by a nut 35. It will be apparent that with the hood at a predetermined height above the pallets, the part of the weight of the hood supported by the rail 29 through the spring 33 will increase as the nut is screwed downwardly and will decrease as the nut is screwed upwardly.

Secured lengthwise of the lower edge of the side beam 26 at each side of the wind box 25 is a seal bar 36 having secured to its lower face a wearing bar 37. The wear bar 37 rests air tightly on a wear bar 38 mounted air tightly on the pallet outside of the side wall 23. This construction provides an air tight seal outside of and spaced from the side wall 23 of the pallet and out of contact with the heated parts of the pallet and of the upper wind box. The seal thus formed is further isolated from the interior of the wind box or hood by an outwardly extending flange 39 near the upper edge of the pallet side wall 23.

It will be seen that the seal bar 21 and the wear bar 38 are mounted on an outwardly projecting portion of the sides of the pallets, which portion is shown as supporting the wheels 11 and is located below the surface of the grates of the pallets. Thus, the seal is effected in a position between the outside of the pallet walls 23 and the supporting wheels. Obviously, the projection on which the seal bar 21 and wear strip 38 is carried may be considered a longitudinal supporting rib.

In this construction the sealing elements 36—38 are outside of, and spaced from the walls 23, the contents of the pallets and the wall of the windbox subjected to hot gases or flames within the windbox or hood. They are also in contact with the atmosphere so that any heat transferred to them is given up to the surrounding atmosphere and thus dissipated. As a result these elements remain cool and undistorted and an effective seal may be maintained. Lubrication of the relatively sliding surfaces of contact between the sealing elements is also facilitated.

The embodiment illustrated in Fig. 2 is similar to that of Fig. 1 and the various elements are designated with similar reference characters except that the bar 36 is not secured directly to the beam 26 but through a connector piece 40 so that the side wall of the hood may be spaced outwardly from the side of the pallet.

The embodiment of Fig. 3 differs from that of Figs. 1 and 2 in that the side wall 25 of the hood is supported directly and fixedly on the columns 31. The seal bar 36 is secured to the under side of a connector plate 41 extending the full length of the hood and having a downturned edge or flange 42 at the edge opposite to that to which the bar 36 is secured and which is received in and supported, for example, by a horizontal grooved flange 43 of a bracket 44 mounted on the pillar 31, or other form of sealing means. The plate 41 spans and closes the space between the wall 25 and the bar 36 and, hinging on the flange 43, forms a weighted pressure contact between the sealing elements 37 and 38. The plate 41 may be corrugated or of other shape or may be of a flexible, airtight, material, such as asbestos cloth, secured airtightly to the wall 25.

The wear bars 37 and 38 of the seal may be lubricated by any suitable lubricating means. Means for supplying lubricants is illustrated in Fig. 4 in which the lubricant is supplied in metered amounts in successive timed cycles by a calibrated lubricant metering device 45 to a supply line 46 leading to a lubricant passage 47 in the sealing bar 36. The passage 47 extends downwardly through the wear plate 37 and widens to the plate 38.

In the above invention I have provided a sealing surface extending substantially unbroken and in a straight line directly above and mounted on the extended hubs carrying the wheels and axles and out of contact with the pallet sides or flanges, which is below the direct heat contact zone of the materials being processed and which is protected from the ignition burner flame and heat by the pallet sides and which is below the point where objectionable gases or dusts may be blown out when pressures are used. The pallet wheels are outside the windbox and hood enclosed areas and are not subjected to seriously damaging heats, gases or dusts to which they would be subjected by ineffective seals.

I claim:

1. A sintering machine having pallets, each comprising a grate and upwardly extending side walls and having supporting means outside of and below each of said side walls, means to move the pallets on the supporting means in a flat plane in contacting succession, each of said pallets having at each side thereof a rigid longitudinally extending seal bar positioned below the top of the grate and between each said side wall and the adjacent supporting means and projecting laterally from each side of the pallet, and enclosure hood above said pallets having side walls extending downwardly outside of the side walls of the pallets, and means connected with each hood side wall airtightly and slidably engaging the pallet seal bar at its respective side of the pallet.

2. The sintering machine defined in claim 1 including yielding means connected with the enclosure hood, and acting to support a part of the weight thereof, the balance of the weight resting on the pallet seal bars.

3. The sintering machine defined in claim 1 in which a closure plate member extends the length of the hood at each side of said pallets and is flexibly and airtightly secured thereto and is connected with said seal bar.

4. The sintering machine defined in claim 3 in which said closure plate is of flexible material.

5. The sintering machine defined in claim 3 in which said closure plate is provided with a longitudinal pivotal, substantially airtight connection.

6. In a sintering machine, a combination with pallets comprising horizontal grates and upwardly rising parallel side walls having grate supporting portions extending below the top surface of the grate, and said portions having rigid outwardly and longitudinally extending ribs, supporting wheels and axles therefor carried by said ribs, longitudinally extending aligned seal bars rigidly and tightly fitted to the upper and lower sides of said ribs, a hood above the pallets having closed side wall portions extending downwardly at each side of the pallets and spaced therefrom, a wind box below the pallets, wear strips engaging the seal bars at the upper and lower sides of said ribs, and airtight sealing connections between the last-named wear strips and the side wall portions of the hood and with the wind box respectively, the contacting seal bars and wear strips being positioned between the supporting wheels and the pallet side walls.

References Cited in the file of this patent

UNITED STATES PATENTS

| | | |
|---|---|---|
| 1,308,864 | Reckard | July 8, 1919 |
| 1,774,135 | Fassotte | Aug. 26, 1930 |
| 1,880,146 | Morison | Sept. 27, 1932 |
| 2,245,323 | Shallock | Sept. 2, 1941 |
| 2,710,183 | Urban | June 7, 1953 |